May 29, 1934. H. H. ROBINSON 1,960,754
SELF CONNECTING COUPLING DEVICE FOR TRACTORS AND TRAILERS
Filed April 2, 1932 2 Sheets-Sheet 1
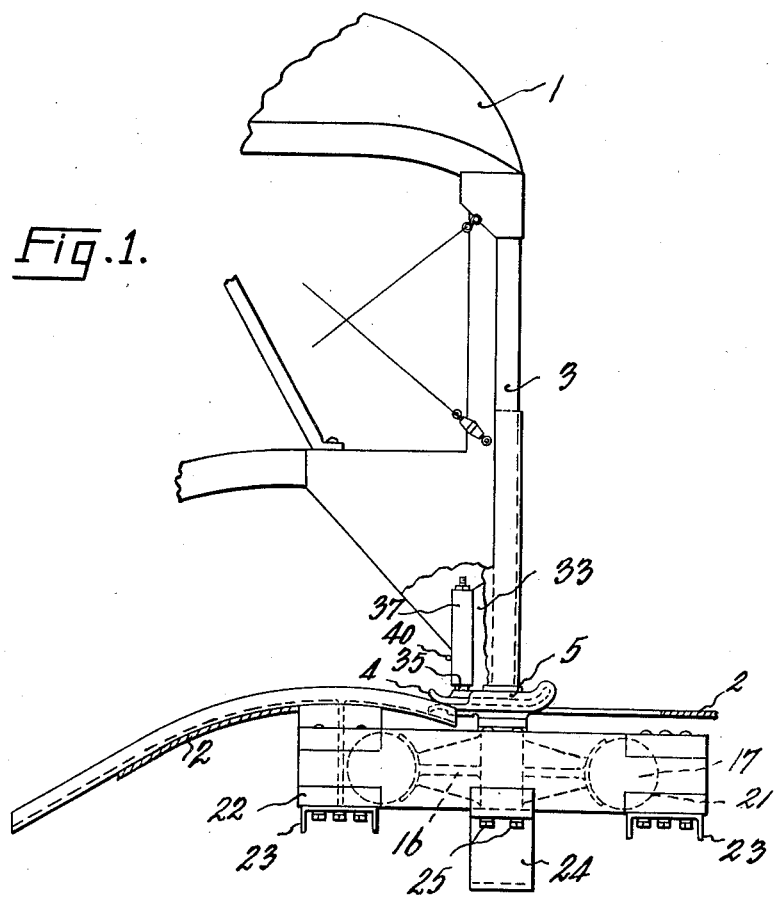
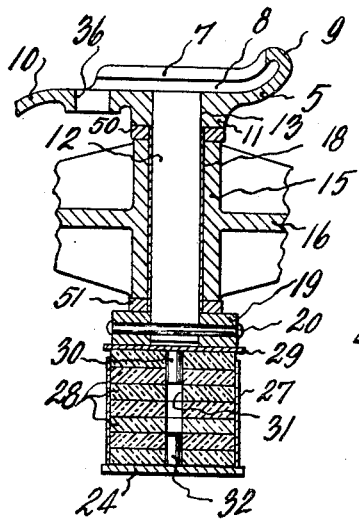
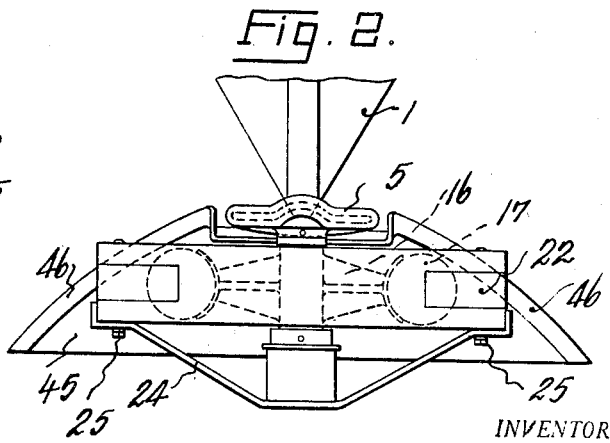
INVENTOR.
HAROLD H. ROBINSON
BY Chapin & Neal
ATTORNEYS.

May 29, 1934.                H. H. ROBINSON                1,960,754
              SELF CONNECTING COUPLING DEVICE FOR TRACTORS AND TRAILERS
                    Filed April 2, 1932          2 Sheets-Sheet 2
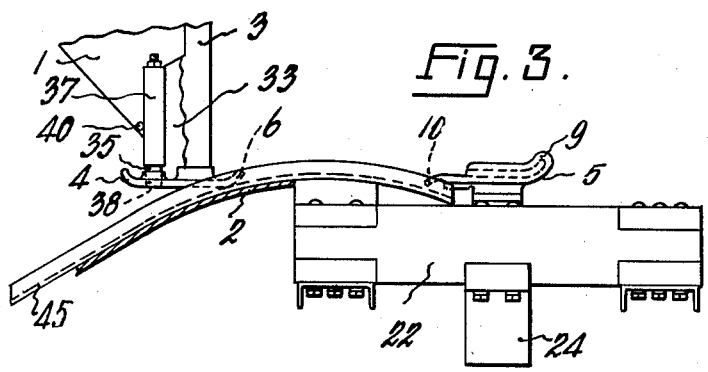
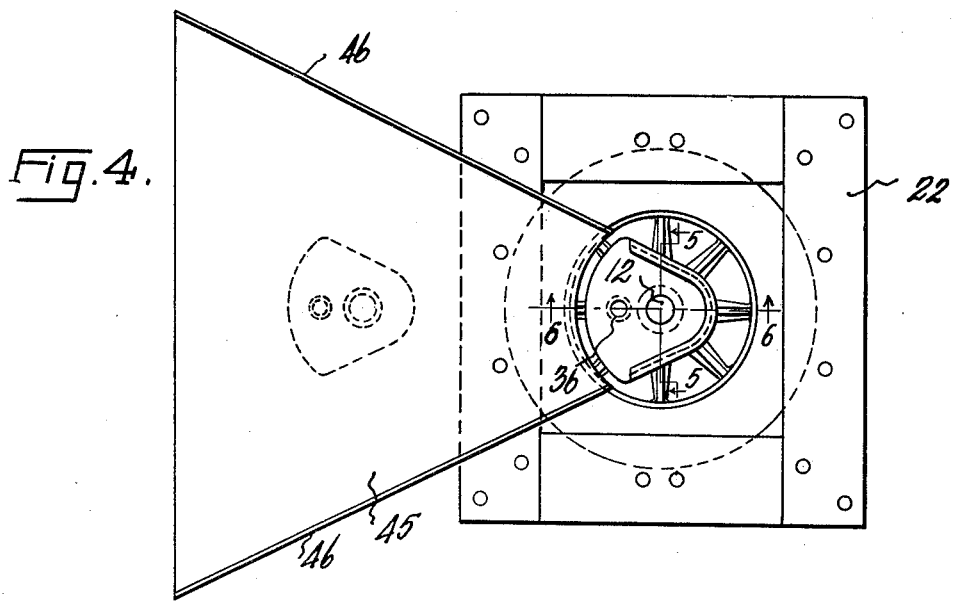
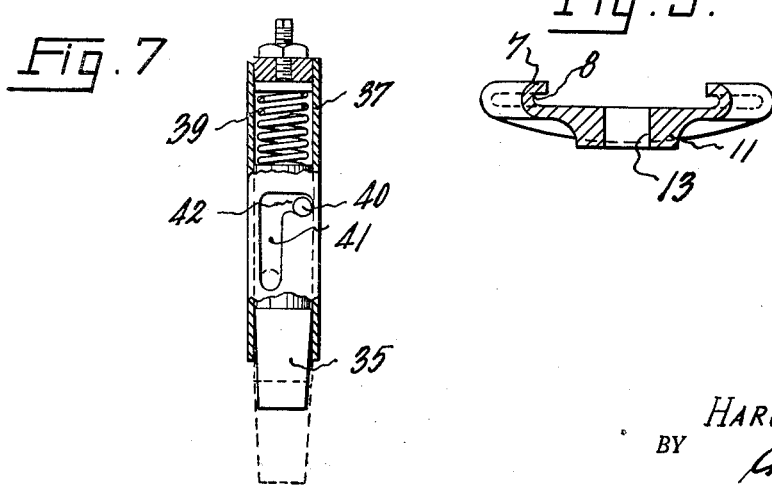
INVENTOR.
HAROLD H. ROBINSON
BY
Chapin & Neal
ATTORNEYS.

Patented May 29, 1934

1,960,754

UNITED STATES PATENT OFFICE 1,960,754

SELF CONNECTING COUPLING DEVICE FOR TRACTORS AND TRAILERS

Harold H. Robinson, Opa Locka, Fla., assignor to Curtiss Aerocar Company, Inc., Opa Locka, Fla., a corporation of Florida Application April 2, 1932, Serial No. 602,755

6 Claims. (Cl. 280—33.1)

This invention relates to means for coupling or connecting two vehicles together for articulated tractor and trailer operation. More particularly, it relates to a vehicle combination in which the forward end of the trailer vehicle is supported on the tractor vehicle such trailer vehicle generally being called a semi-trailer. It has for its principal object the provision of coupling means in which the load and draft action between the coupled vehicles are cushioned under all operating conditions and in which the operation of connecting and disconnecting of the vehicles is rendered semi-automatic. Other and more specific objects will be apparent from the following specification and claims.

While the invention is independent of the type of vehicles coupled together, it finds a special utility in the connection of passenger carrying trailers to conventional pleasure cars as tractors and such combination is illustrated in the accompanying drawings, in which:

Fig. 1 is a side elevation of one embodiment of the invention showing the parts in operative relation;

Fig. 2 is a view looking from the right of Fig. 1, the tractor frame being omitted;

Fig. 3 is a side elevation showing the position of the members at the start of the coupling operation;

Fig. 4 is a plan view of the parts of the coupling mechanism carried by the tractor;

Fig. 5 is a sectional detail on a larger scale taken substantially on line 5—5 of Fig. 4;

Fig. 6 is a sectional detail on a larger scale of the coupling shoe taken on line 6—6 of Fig. 4; and Fig. 7 is a detail view, partly in section, of the locking pin.

Referring to the drawings, 1 designates the forward portion of the trailer vehicle and 2 designates the rear deck of the tractor vehicle. The trailer frame, as shown, includes a prow portion 3 to the bottom of which is rigidly secured a coupler foot 4 adapted to be slid endwise into a shoe 5 pivotally mounted on the tractor. The forward edge of the foot 4 is formed as a rounded nose 6 which, as best shown in Fig. 3 is curved upwardly to facilitate the coupling operation as later described. Shoe 5 is shaped to snugly receive the foot 4 and is provided with an overturned flange 7 at its front and side edges to form a groove 8 in which the edges of foot 4 engage. The forward portion of the shoe is curved upwardly at 9 to accommodate the curved nose 6 of foot 4, while the wide rear edge is curved downwardly as at 10 to cooperate with nose 6 in the coupling operation as hereinafter explained.

The shoe 5 is provided on its underside with a thickened boss 11 provided with opening 13 in which a stub shaft 12 is fixedly secured in any suitable manner. Stub shaft 12 is rotatably mounted in the hub 15 of a wheel 16 which is provided with a pneumatic tire 17 of any conventional or suitable type, such for example, as those used on aeroplanes. As shown in Fig. 6 the hub 15 is provided with a suitable bearing sleeve 18 and stub shaft 12 is held against axial movement therein by a collar 19 pinned at 20 to the shaft. Washers 50 and 51 are provided one at each end of said stub shaft.

The wheel 16 is mounted in a horizontal position in the deck 2 of the tractor vehicle through engagement of the tread portion of the tire 17 in arcuate seats 21 formed in the inner faces of rectangular frame 22. Frame 22 is supported in the deck of the tractor vehicle in any suitable manner as by a sub framing 23. Frame 23 carries a downwardly bent transverse strap 24 secured by bolts 25 to the underside of said frame. This strap 24 supports a vertical resilient cushioning device in the form of a retaining cylinder 27, open at each end, and in which is positioned a stack of annular rubber discs 28. The stack of discs is slightly higher than the length of the cylinder 27. A bearing plate 29 rests upon the stack of discs and is held in position by a downwardly extending stud 30 which engages in the central openings 31 of the discs and extends well below the upper edge of the cylinder 27. A similar stud 32 is secured to, and extends upwardly from the strap 24 which serves as the bottom of the cylinder, the adjacent ends of studs 30 and 32 being substantially spaced from each other. The stack of discs is in line with stub shaft 12 and collar 19 rests upon the plate 29 so that that portion of the trailer load transmitted to the tractor through the coupling is resiliently borne by the rubber discs.

When the foot 4 is in position in the shoe 5, the articulation to permit dirigible movement of the tractor with respect to the trailer is provided by rotation of shaft 12 in the hub 15, and longitudinal or lateral rocking or twisting of one vehicle with respect to the other is resiliently permitted by the flexibility of the pneumatic tire, in all angular positions of the two vehicles. Foot 4 is adapted to be releasably held in the shoe 5 by means of a vertical pin 35 (see Figs. 1 and 7) engageable in an opening 36 in the shoe 5. Pin 35 is slidably supported in a housing 37 secured by bracket 33 to the trailer prow portion 3 and is normally projected through an opening 38 in foot 4 into engagement with opening 36 in the shoe by a spring 39 compressed between the end of housing 37 and the pin. Movement of the pin 35 in the housing 37 is limited by a knob 40 projecting from the pin and sliding in a slot 41 formed in the housing. The slot 41 is formed at its upper end with an offset portion 42 into which knob 40 may be turned as shown in Fig. 7 to hold the pin 35 in retracted position.

The deck of the tractor vehicle is provided rearwardly of the pivoted shoe 5 with a curved plate 45 having upstanding side guide flanges 46 converging toward the shoe. When it is desired to couple the tractor and trailer vehicles together, assuming that the prow of the trailer is jacked up or otherwise supported at approximately the proper height, it is only necessary to back the tractor beneath the prow as shown in Fig. 3. The foot 4, engaging and riding upon plate 45, is guided into shoe 5 by the flanges 46. The shoe 5 need only be turned into approximate position for registering with the foot 4, since the rounded nose of the foot engaging the flanges 7 of the shoe will automatically rotate it into alignment. When the parts are in complete interengagement the pin 35 will snap into opening 36 of the shoe to lock the coupling together. To uncouple the vehicles, pin 35 is withdrawn and held in withdrawn position by engagement of knob 40 in the offset portion 42 of slot 41, after which the tractor may be driven from beneath the trailer.

It will be seen that by the construction described the load weight of the trailer on the tractor is resiliently supported, through the coupling or cushioning means 27, and that the draft action is cushioned in all angular positions of the vehicle by tire 17 which also permits a resilient rocking movement between the vehicle in all vertical planes.

What I claim is:

1. A coupling device for connecting two vehicles together for tractor-trailer operation which comprises, a horizontal plate rigidly secured to one of the vehicles, a shoe pivotally mounted on the other vehicle and into which said plate may be horizontally slid, means on the shoe to prevent vertical separation of the plate and shoe, said shoe being resiliently mounted for cushioned oscillatory movement in all directions, and means to releasably lock the plate and shoe against relative horizontal movement.

2. A coupling device for connecting two vehicles together for tractor-trailer operation which comprises, a horizontal plate rigidly secured to one of the vehicles, a shoe pivotally mounted on the other vehicle and into which said plate may be horizontally slid, means on the shoe to prevent vertical separation of the plate and shoe, said shoe being resiliently mounted for cushioned oscillatory movement in all directions, means to cushion the load transmitted from one vehicle to the other through the coupled plate and shoe and means to releasably lock the plate and shoe against relative horizontal movement.

3. A coupling device for connecting two vehicles together for tractor-trailer operation which comprises, a horizontal plate rigidly secured to one of the vehicles, a shoe pivotally mounted on the other vehicle and into which said plate may be horizontally slid, an upwardly curving guide plate mounted on the last named vehicle and having upstanding guide flanges converging toward the shoe adapted to guide the plate into the shoe, means to prevent vertical separation of the plate and shoe and means to releasably lock the plate and shoe against relative horizontal movement.

4. A coupling device for connecting two vehicles together for tractor-trailer operation which comprises, a horizontal plate rigidly secured to one of the vehicles and having an upwardly curved forward edge, a shoe pivotally mounted on the other vehicle and into which said plate may be horizontally slid, said shoe having a downwardly curved rear edge adapted to cooperate with the upwardly curved edge of the plate to facilitate entrance of the plate into the shoe, an upwardly curving guide plate mounted on the last named vehicle and having upturned guide flanges converging toward the shoe adapted to guide the plate into the shoe, means to prevent vertical separation of the plate and shoe and means to releasably lock the plate and shoe against horizontal separation.

5. A coupling device for connecting two vehicles together for tractor-trailer operation which comprises, a horizontal plate member secured to one of the vehicles, a shoe member in which said plate is engageable, said shoe being pivotally mounted in the hub of a horizontally positioned wheel provided with a pneumatic tire and secured by the tread portion of the tire to the second vehicle, and means to releasably lock said plate and shoe against relative horizontal movement.

6. A coupling device for connecting two vehicles together for tractor-trailer operation which comprises, a horizontal plate member secured to one of the vehicles, a shoe member in which said plate is engageable, said shoe being pivotally mounted in the hub of a horizontally positioned wheel provided with a pneumatic tire and secured by the tread portion of the tire to the second vehicle, a resilient buffer mounted on the last named vehicle in position to sustain substantially the entire vertical load imposed upon the hub of the wheel and means to releasably lock said plate and shoe against relative horizontal movement.

HAROLD H. ROBINSON.